Patented July 4, 1933

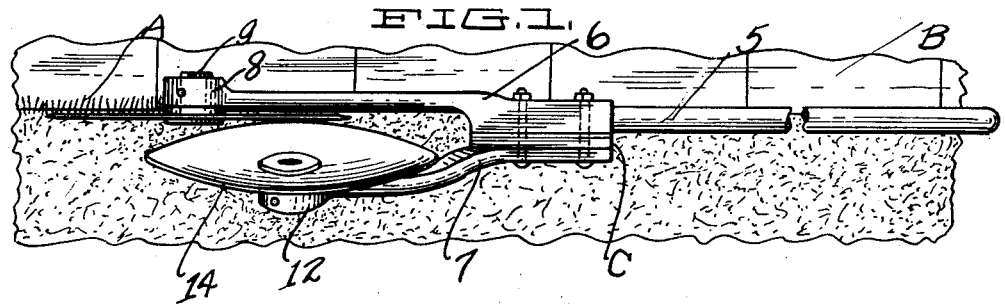
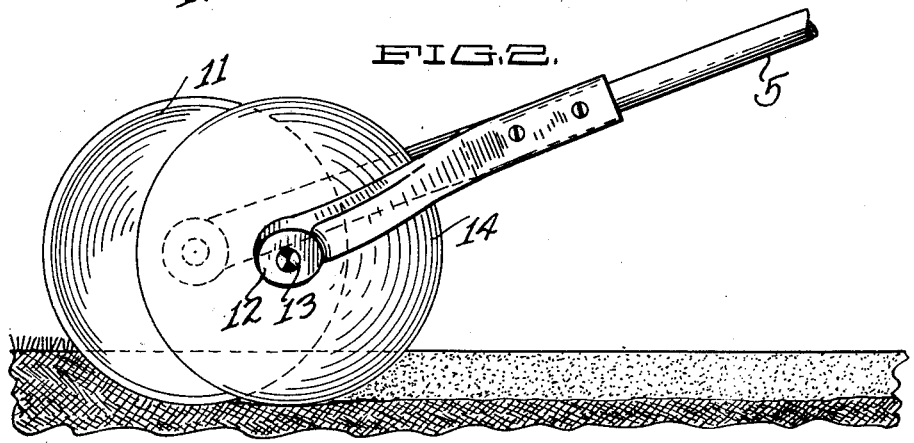
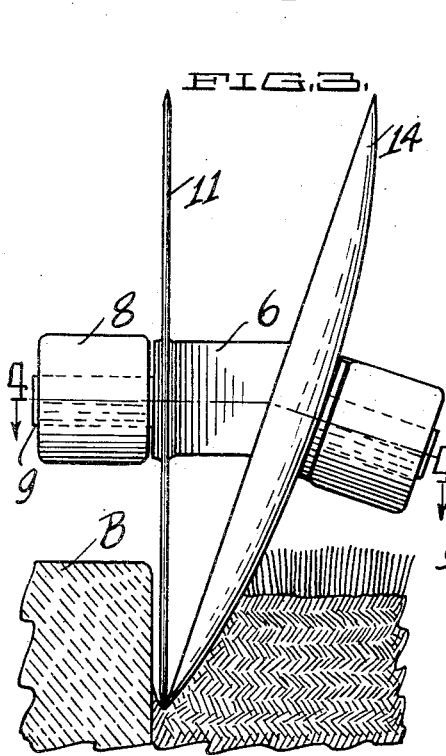
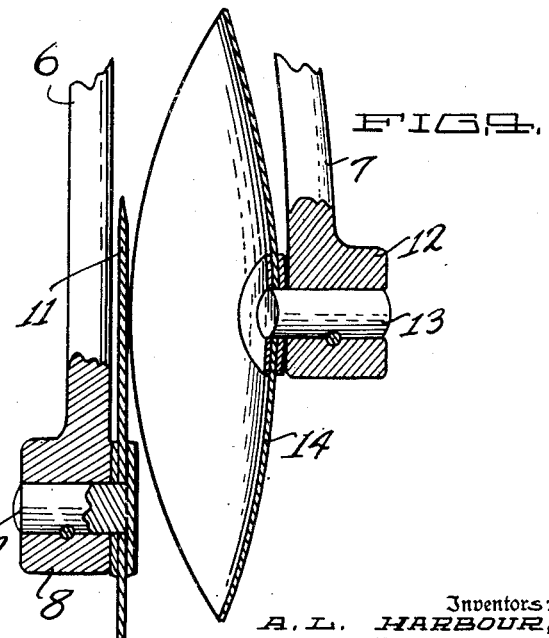

1,916,725

UNITED STATES PATENT OFFICE

ARTHUR LEROY HARBOUR AND HARRY ALBRECHT, OF PORTLAND, OREGON

LAWN EDGER

Application filed July 27, 1932. Serial No. 625,160.

This invention relates to improvements in lawn edgers.

The principal object of this invention is to produce a device wherein the grass and like vegetation adjacent the edge of a walk or the like may be readily cut and the cut material thrown out.

A further object is to produce a device which is economical to manufacture.

A further object is to produce a device which is easy to operate.

A further object is to produce a device wherein various widths of trench cut adjacent the walk may be readily accomplished.

A still further object is to produce a device that is readily portable.

Other objects and advantages will be apparent during the course of the following description.

In the accompanying drawing forming a part of this specification and in which like numerals are employed to designate like parts throughout the same, Fig. 1 is a top plan view of our device as the same would appear in use, Fig. 2 is a side elevation of Fig. 1, Fig. 3 is an enlarged front plan view, and Fig. 4 is a cross sectional view on the line 4—4 of Fig. 3.

In the trimming of grass or lawns adjacent a sidewalk, it is almost impossible to effectively cut the lawn with the ordinary lawn mower and to present a neat appearance due to the fact that some of the grass will lay upon the walk and therefore the blades of the lawn mower will not cut them. It is possible to run the present device along the edge of the walk to cut this overlying grass and to further cut a small trench adjacent the walk, and at the same time throw out onto the walk, the sod and dirt cut from the trench, thus leaving a neat appearance and also the trench serves as a gutter to catch dirt which may be swept from the sidewalk at other times than when the grass is being cut.

In the accompanying drawing wherein for the purpose of illustration is shown a preferred embodiment of our invention, the numeral 5 designates a handle which is provided with a two-part yoke, one part designated by the numeral 6 and the other part by the numeral 7. The part 6 has a bearing 8 in which a shaft 9 is positioned and upon which a flat disc 11 is rotatably held, which disc is the one which does the cutting of the grass adjacent the walk and is maintained in a vertical position during the operation of the tool. The part 7 has a bearing 12 in which is secured a shaft 13 upon which is rotatably supported a dished disc 14. The axis of the disc 14 is offset angularly with respect to the axis of the disc 11 and also is offset rearwardly therefrom, the result being that the disc 14 follows the disc 11.

In operation the device is used as shown in Figs. 1, 2 and 3 with the result that the blade 11 will cut the grass A overlying the walk B and the disc 14 will cause a trench to be formed adjacent the walk and further the dished effect of the disc 14 will cause the material being cut from the ditch to be thrown out upon the walk B. In Fig. 1 we have shown a spacer block C which may be inserted between the parts 6 and 7. By using spacer blocks of various thicknesses, the horizontal distance between the blade 11 and disc 14 may be varied, and consequently the ditch formed may be of any desired width within reason, as for instance, from one-half inch to three inches.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a lawn edger, a handle, a separable yoke secured to said handle, a rotatable flat disc carried on one portion of said yoke, and a dished disc rotatably carried on the other portion of said yoke, the axes of said discs being angularly disposed with relation to each other.

2. In a lawn edger, a handle, a separable yoke secured to said handle, a rotatable flat disc carried on one portion of said yoke and a dished disc rotatably carried on the other portion of said yoke, the axes of said discs being angularly disposed with relation to each other, and a spacer block interposed between the separable portions of said yoke.

3. In a lawn edging tool, a handle, a yoke comprising two portions, each of said portions having a bearing at one end thereof, a flat disc rotatably mounted in one of said bearings, and a dished disc mounted in the other of said bearings, the axes of said discs being angularly disposed with relation to each other, said dished disc being rearwardly disposed relative to the flat disc and effective in the same horizontal plane therewith.

In testimony whereof we affix our signatures.

ARTHUR LEROY HARBOUR.
HARRY ALBRECHT.